(12) United States Patent
Hellman et al.

(10) Patent No.: US 8,805,170 B2
(45) Date of Patent: Aug. 12, 2014

(54) SYSTEM AND METHOD FOR MEMORY STORAGE OF VIDEO DATA

(75) Inventors: Timothy M Hellman, Concord, MA (US); Yong Yu, Andover, MA (US)

(73) Assignee: Broadcom Corporation, Irvine, CA (US)

( * ) Notice: Subject to any disclaimer, the term of this patent is extended or adjusted under 35 U.S.C. 154(b) by 42 days.

(21) Appl. No.: 13/414,420

(22) Filed: Mar. 7, 2012

(65) Prior Publication Data
US 2013/0236163 A1 Sep. 12, 2013

(51) Int. Cl.
*H04N 5/92* (2006.01)
*H04N 5/93* (2006.01)
*H04N 5/91* (2006.01)

(52) U.S. Cl.
USPC .. 386/326; 386/353; 386/E5.009; 386/E5.028

(58) Field of Classification Search
USPC .......................................................... 386/326
See application file for complete search history.

(56) References Cited

U.S. PATENT DOCUMENTS

| | | | | |
|---|---|---|---|---|
| 5,349,446 A | * | 9/1994 | Kwak | 358/296 |
| 6,023,266 A | * | 2/2000 | Eglit et al. | 345/555 |
| 8,130,317 B2 | * | 3/2012 | Li | 348/453 |
| 2003/0151610 A1 | * | 8/2003 | Kuriakin et al. | 345/589 |
| 2005/0069169 A1 | * | 3/2005 | Zarrabizadeh | 382/100 |
| 2012/0081580 A1 | * | 4/2012 | Cote et al. | 348/231.99 |

* cited by examiner

*Primary Examiner* — Thai Tran
*Assistant Examiner* — Nien-Ru Yang
(74) *Attorney, Agent, or Firm* — Brinks Gilson & Lione

(57) ABSTRACT

A video processing system includes a memory to store video data and a decoder to fetch the video data for processing. The decoder can be configured to perform a first fetch to obtain a luminance data and to perform a second fetch to obtain both a chrominance data and an additional portion of the luminance data.

19 Claims, 5 Drawing Sheets

| 10 Bit Source | | Output Value | |
|---|---|---|---|
| Upper 8 bits | Lower 2 Bits | 8 Bit output | Extra bits |
| X | 0 0 | X | 0 0 |
| X | 0 1 | X | 0 1 |
| X | 1 0 | X + 1 | 1 0 |
| X | 1 1 | X + 1 | 1 1 |

FIG. 6

SYSTEM AND METHOD FOR MEMORY STORAGE OF VIDEO DATA

TECHNICAL FIELD

This disclosure relates to memory storage, and more particularly to memory storage of video data.

BACKGROUND

Video coding standards such as MPEG (Moving Pictures Expert Group), AVC (Advanced Video Coding) (e.g. H.264) and HEVC (High Efficiency Video Coding) can require the use of reference frames in the decoding process. These reference frames can include a short history of previously decoded video data, and can be used to form predictions of the video data presently being decoded. The reference frames can also be the output frames that are sent to the display. While an 8-bit representation of the video data may be commonly used today, the HEVC video standard and other standards may require or optionally provide that video decoders keep a 10-bit representation of video data.

BRIEF DESCRIPTION OF THE DRAWINGS

The system may be better understood with reference to the following drawings and description. In the figures, like reference numerals can designate corresponding parts throughout the different views.

FIG. 6 is a chart illustrating exemplary rounding of 8-bit components.

DETAILED DESCRIPTION

The discussion below relates to an efficient way to store and handle processing of different sized bit representations of data. For example, new video standards may require that video decoders keep a 10-bit representation of reference video data. Currently, 8-bit representations are typically used. The described systems and methods can allow efficient memory access and efficient storage of both 8-bit and 10-bit data representations. The systems and methods need not require full duplicates of reference frames to simultaneously handle both 8-bit and 10-bit representations. The systems and methods can save on system costs, e.g., the amount of DRAM (dynamic random access memory) or other memory required, for systems that support a video decoder with 10-bit reference frames. The systems and methods can also simplify the addition of such a decoder into existing systems that support 8-bit YUV 4:2:0 data today. Additionally or alternatively, the systems and methods can apply to any application that uses 4:2:0 video, and requires 10-bit or mixed 8-bit and 10-bit video representations.

Figure 1:
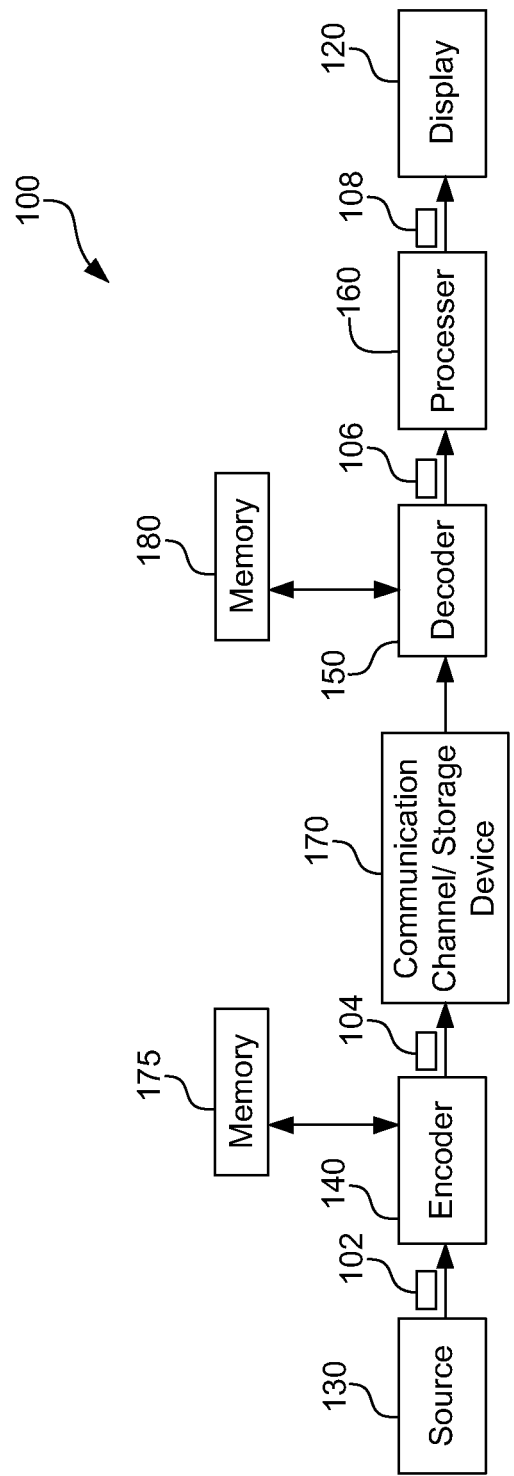
FIG. 1 is a block diagram of an exemplary image processing system.

FIG. 1 is an exemplary image processing system 100 including an encoder 140 adapted to receive an input frame or picture stream 102 from an image source 130. The words "picture" and "frame" may be used interchangeably herein. Picture stream 102 may be converted to a coded data stream 104 by encoder 140 to compress the picture stream 102 for sending over a communication channel and/or for storing to a storage device 170. The communication channel 170 can include different communication types, including wired or wireless, such as cable, satellite, WIFI, etc. The storage device 170 can include various media such as writable or read only media, including digital video recorders (DVR) and Digital Versatile Discs (DVD's), etc.

A decoder 150 receives the coded data stream 104 and decodes it to output a decoded picture stream 106, including a sequence of output pictures. The decoded picture stream 106 can be processed by processor 160 to produce processed frames 108. The processed frames 108 can be displayed on any display 120, such as a phone display, a computer display, liquid crystal display (LCD), light emitting diode (LED), organic light emitting diode (OLED), plasma televisions, etc. The encoder 130, decoder 150 and processor 160 may be implemented together or separately as part of an image processing circuit, and may be implemented on the same or different devices. The encoder 130, decoder 150 and processor 160 may be implemented with hardware, firmware or software, or any combination of them.

The image processing system 100 may be configured to process images for display. The encoder 140 and/or decoder 150 can access memories 175 and 180 which stores reference pictures to aid with image processing. The reference pictures can be 8-bit or 10-bit representations as required by the implementation or standard. The memories 175 and 180 can be implemented together, as a single memory, or separately, such that the encoder 140 and the decoder 150 can access the same physical memory or different memories. Image processing can include by motion estimation, e.g. by encoder 140 and motion compensation, e.g., by decoder 150. Other types of processing may also occur such as frame rate conversion, spatial prediction, sampling, judder reduction, motion blur enhancement, scaling, adding graphics (e.g., processor 160), etc. Processing may occur at the display 120, and additionally or alternatively, the processing may occur in other devices such as a cable or satellite set-top box, an internet protocol television (IPTV) box, a gaming device such as Playstation or Xbox, a Blu-ray player, a digital-video-digital (DVD) player, or a streaming network player such as Hulu, YouTube or Netflix. Other examples of devices having some or all of the components of the image processing system 100 can include phones, handheld gaming devices, cameras or security camera systems.

The coded data stream 104 may be transmitted and received wirelessly or by wire. If received wirelessly, the coded data stream 104 may be received by an antenna, for example such as ultra-high frequency (UHF), very high frequency (VHF) or satellite signals. In addition or alternatively, the coded data stream 104 may be received via a streaming wire interface, such as by a cable system in which the signals are received by a cable box. The coded data stream 104 may also be accessed stored data in which an address is provided for the data to be retrieved from the memory of a storage medium, such as a hard disk or USB drive. The coded data stream 104 may be sent or received in digital or analog form. There may or may not be handshaking involved with sending and receiving the signals.

In a non-limiting embodiment, the image processing system 100 can be implemented in an application-specific integrated circuit (ASIC) such as can be integrated into a television set, computer graphics processor, a video processor or other electronic device. In another non-limiting embodiment, the image processing system 100 (e.g., including the encoder 140 and decoder 150) can be implemented by programmable elements of a computing device such as a personal computer, mobile computer or mobile communication device.

Figure 2:
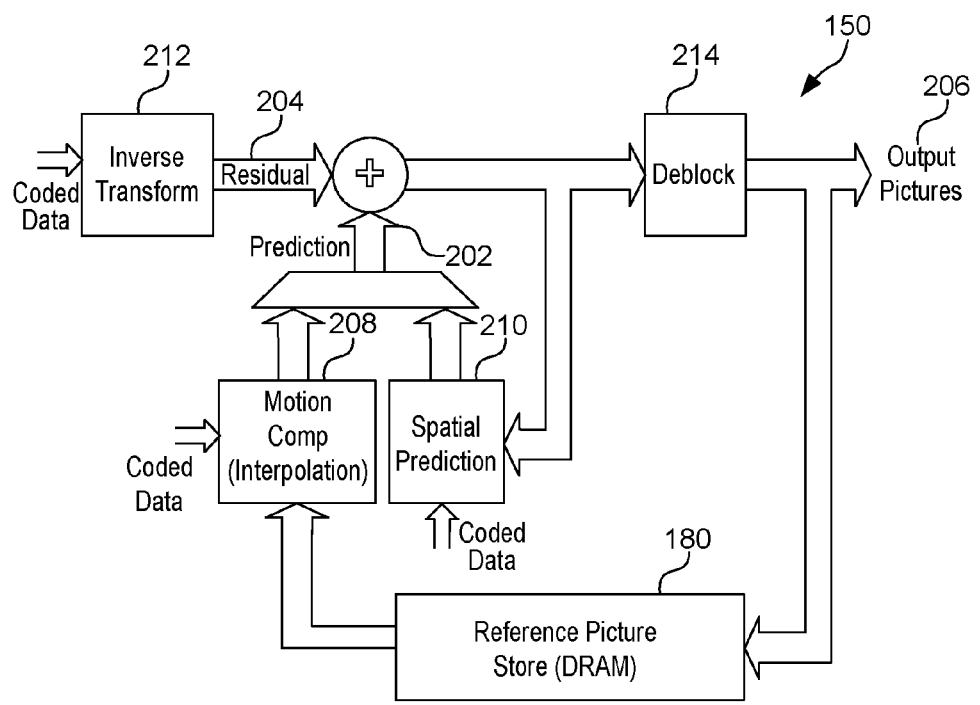
FIG. 2 is a block diagram of an exemplary decoder.

FIG. 2 is a block diagram of an exemplary decoder 150 for decoding picture data to output to the display 120. An AVC decoder is used for purposes of explanation, but other types of decoders can be used. With video compression, the predicted picture 202 plus the residual 204 create the output picture 206. The predicted picture 202 can be the result of different video processing such as by a motion compensator 208, e.g., through interpolation, and a spatial predictor 210. Coded data from the encoder 140 can be inputted to the inverse transform 212, the motion compensation 208 and the spatial prediction 210. The residual picture may be inverse transformed if the encoder 140 transformed the residuals to reduce the size. The picture may also be deblocked 214 such as to remove artifacts before being output. The output pictures 206 can be stored in reference picture storage 180 to become reference pictures for the motion compensator 208. The reference picture store 180 can store the reference pictures as 8-bit or 10-bit representations as required by the implementation or standard. The encoder 140 can perform similar functions and can access the same or similar picture storage of memory 175.

Figure 3:
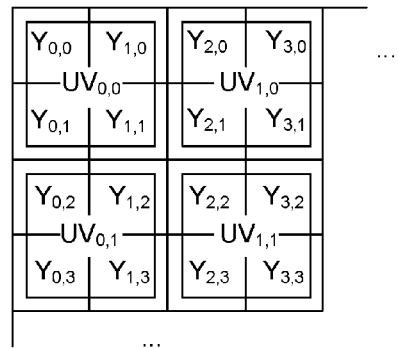
FIG. 3 is a block diagram of an exemplary video data to be stored in memory locations.

FIG. 3 is a block diagram of exemplary video data to be stored in memory, such as stored in reference picture storage of memories 175 and 180, e.g., DRAM. For purposes of explanation the video color space is referred to as YUV, in which every picture is represented using 3 components: one luminance (Y), and two chrominance (UV). Other color schemes can be used and handled with the systems and methods described herein such as Y'UV, YCbCr, YPbPr and RGB. Each pixel for each YUV component is encoded with a determined number of bits, e.g., 8-bits and 10-bits, as necessary for the implementation or the standard.

For video processing a sub-sampled version of the chrominance components of the color space can be used, referred to as YUV 4:2:0. The chrominance components can be sub-sampled by two in the X and Y direction, so each chrominance plane in a YUV 4:2:0 picture is smaller than the luminance component by a factor of four. In FIG. 3, chrominance value $UV_{0,0}$ can correspond to $Y_{0,0}, Y_{0,1}, Y_{1,0}$ and $Y_{1,1}$. Moreover, $UV_{0,1}$ can correspond to $Y_{0,2}, Y_{0,3}, Y_{1,2}$ and $Y_{1,3}$; $UV_{1,0}$ can correspond to $Y_{2,0}, Y_{2,1}, Y_{3,0}$ and $Y_{3,1}$; and $UV_{1,1}$ can correspond to $Y_{2,2}, Y_{2,3}, Y_{3,2}$ and $Y_{3,3}$, etc.

Figure 4:
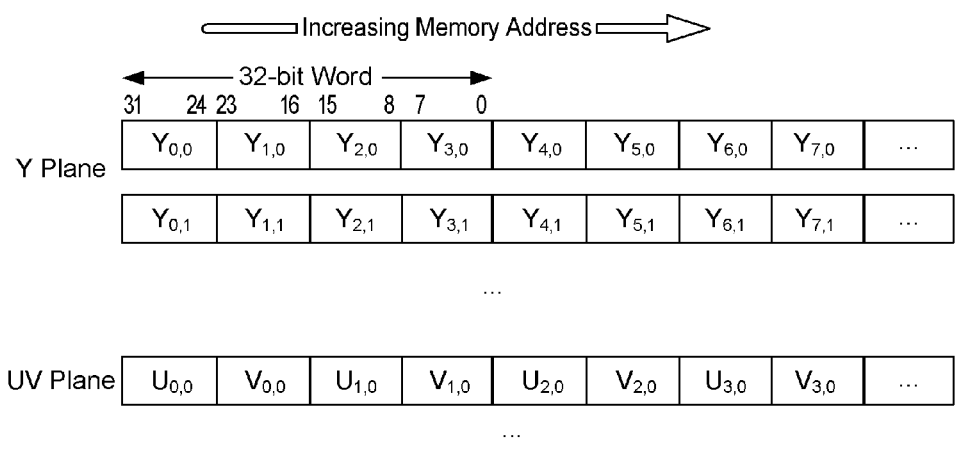
FIG. 4 is a block diagram of an exemplary 8-bit representation of the data fields for the YUV components.

FIG. 4 is a block diagram of exemplary memory fields for storing 8-bit representation of the pixels for the YUV components. The luminance representations $Y_{0,0}, Y_{0,1}, Y_{1,0}$ and $Y_{1,1}$, etc. can be stored as 8-bit fields in a Y plane, or other grouping, in memory and the chrominance representations $U_{0,0}$ and $V_{0,0}$ can be stored as 8-bit fields in a UV plane in memory. With such a field structure stored in two planes, the YUV representations can be accessed efficiently from memory because the pixel data can be packed into 32-bit words, and the words can be accessed in contiguous bursts. In addition, the YUV data can be stored in less or more than two planes. Packing the YUV data together in one plane may be impractical, however, as the UV sub-sampling can lead to an irregular data formats. In addition, packing the YUV data in more than two planes can cause additional fetches from memory and require more physical memory to store the representations, which can be costly.

For 8-bit wide pixel representations, storing the Y component in one plane and the UV components in another plane allows for DRAM fetch alignment. Video decoders can accomplish many fetches of rectangular pixel patches, so DRAM fetch alignment efficiency for these fetches can be important. Eight bit representations fit well within 32 bit words for purposes of fetching the Y and UV components from memory. But for video that achieve a similar picture quality at a higher compression rate, 10-bit or other bit representations, in addition or alternatively to 8-bit representations, may be used. Ten bit representations, however, may not divide evenly into 32 bit words.

Figure 5:
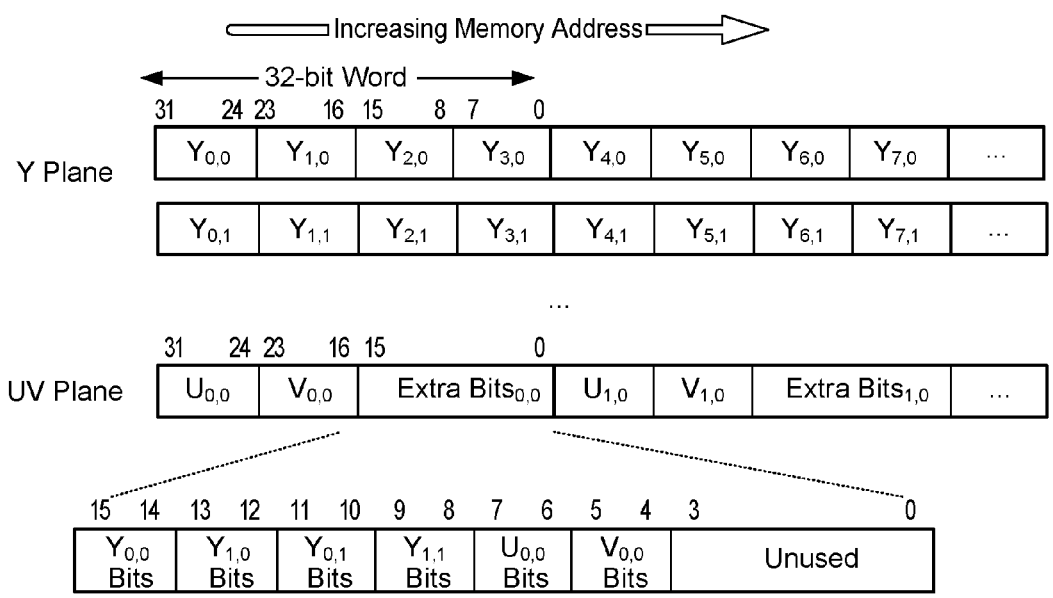
FIG. 5 is a block diagram of an exemplary 8-bit and 10-bit representation of the data fields for the YUV components.

FIG. 5 is a block diagram of exemplary memory fields for storing 8-bit and 10-bit representation of the YUV components. While 8-bits and 10-bits are discussed, other sized bit combinations can be used. Video decoding standards, such as HEVC presently passing through the standards process, can call for a 10-bit representation of reference frames to improve coding efficiency, e.g., increase data compression for a similar video quality. Additionally, standards such as AVC have special profiles to allow the coding of 10-bit input data for higher video quality. These profiles also produce 10-bit reference frames. The 8-bit representations of the luminance Y can be stored in the Y plane in memory and 8-bit representations of the chrominance U and V can be stored in the UV plane. For the 10 bit representations of the luminance Y and chrominance UV, the extra two bits from the group of Y and UV components can be stored in a single 16-bit word in the UV plane. The extra Y bits can be stored in a memory address adjacent to the corresponding UV bits. Therefore, a third memory plane is not needed to store the extra bits, allowing for at most two fetches, a fetch from the Y plane and a fetch from the UV plane, to obtain the bit data. In other implementations the extra bits can be stored in other planes, such as the Y plane, a third plane or all the bits being stored in a single plane.

For purposes of explanation, the first 16-bit word can provide the 8-bit representations of U and V. The next 16-bit word can provide the extra bits (Extra $Bits_{0,0}$) for the four luminance components $Y_{0,0}, Y_{1,0}, Y_{0,1}$ and $Y_{1,1}$ and the two associated chrominance components $U_{0,0}$ and $V_{0,0}$. The extra bits can come from the least significant bits of the 10-bit representation and the remaining 8-bits are stored as the 8-bit representations. Therefore, 64 total bits can be used to provide both the 8-bit and 10-bit representations of YUV. The first portion of the luminance data, e.g., the 8-bit representations, are provided with 32 bits and the second portion of the luminance data, e.g., the remaining 2 bits for the 10-bit representation, and the chrominance data is provided with 32 bits. There may be four unused bits per 64 bit group since the chrominance representations and the extra 2 bit luminance representations only take up 28 bits of memory space. The four unused bits amount to about only about 6% overhead, or about 94% efficiency, since a total of 60 bits of data are stored YUV representations in every 64 bit word.

The 16-bit word for storing extra YUV bits creates a compact storage representation for 10-bit data that can maintain the packed-byte, power-of-two efficiency of the 8-bit format, while also allowing dual 8-bit and 10-bit representations of the same picture to be provided in minimum memory space. The amount of luminance and chrominance data fetched can be the same for every motion compensation fetch, thereby reducing a complexity of the fetch. The 8-bit representation or the 10-bit representation, or both, can be used by the video decoder and other parts of a video display processes, which can include video processing and display functions. Some video processing and/or display functions may not need to expand to 10-bits for memory bandwidth and chip cost reasons and others may require the 10-bit form to guarantee bit-accurate decoding. Storing video in both the 8-bit and 10-bit representations as described herein can eliminate a need for duplicate representations to be stored to cover either scenario. Therefore, a possible significant, and costly, increase in required memory can be avoided.

FIG. 6 is a chart illustrating exemplary rounding of 10-bit to 8-bit components. The 10-bit component values need not be simply truncated to form the 8-bit stored values. Rather, a more accurate representation may be achieved by rounding up the 8-bit representation by one if the lower two bits of the 10-bit representation are equal to binary '10' or '11'. This can apply for both signed and unsigned component values, and gives an 8-bit representation that can be closest to the 10-bit original. Therefore, when storing the 8-bit representation, the lower two or two least significant bits are removed and stored in the UV plane. If the 10-bit value ended in binary '0.0' or '0.1' the remaining 8-bit representation is stored without changing it. If, however, the 10-bit value ended in binary '10' or '11' the remaining 8-bit representation is increased by one before being stored. The 10-bit value can be reconstructed by reversing the process, e.g., subtracting one from the 8-bit value if the extra bits equal binary '10' or '11'.

Advantages of this format can include byte regularity. The Y component storage format is unchanged from 8-bit representations, and the UV storage changes from 2 bytes per pixel group to 4 bytes, which can maintain the power-of-two byte count for both components. The extra bits from the four luminance pixels associated with one UV sample can be grouped with the UV. Any processing block interested in those luminance pixels also fetches the UV sample, so grouping the extra Y bits with the UV bits can cause no extra fetching burden. The increased UV component size can lead to longer DRAM bursts for a given patch width, which can lead to greater DRAM efficiency. Since no duplicate representations are required, storage space can be minimized for simultaneous 8-bit and 10-bit picture storage. The dual-resolution can be efficiently stored because the Y component is stored the same way for both 8-bit and 10-bit component depths.

The 10-bit video decoder using this format can co-exist with an 8-bit video processing chain. The video decoder can output two chrominance planes, one 8-bit and one 10-bit, for each luminance plane. This can be a savings over duplicating both planes, such as 5 Mbytes/HD picture versus 6.8 Mbytes for complete duplication, which can be otherwise required. The rest of the system can then process 8-bit video data without having to be aware of the 10-bit representation. The video decoder can output 10-bit pictures, and the video processing input, e.g., a feeder, can read the 10-bit input and simply disregard the extra bits. Since the 8-bit version of each component is readily available, this can be a simple modification to processing software. Other 10-bit packed formats could require extensive changes to the addressing and unpacking functions in the feeder. Thus the format can solve the 10-bit video problem both for systems which wish to maintain a lower-cost 8-bit video chain, and also for ones that want to move up to higher 10-bit video quality.

While the extra bits are provided along with the UV component, it is also possible to store the extra bits as a separate plane, giving 3 planes in all: Y, UV and 'extra bits'. This can reduce the amount of memory required for simultaneous 8-bit and 10-bit memory representations, e.g., from a 5 Mbytes/HD picture to 4 Mbytes. Doing so may trade off some 10-bit access memory efficiency, as now three DRAM accesses are used for each rectangular patch. But that may be worth the tradeoff if memory savings is valued more than memory bandwidth.

While the description was described for optimizing cache space on a video processor, it may also be used in other implementations such as for a computer processor. In the cache memory, one representation, such as of video, audio, photo or other data, is provided at full resolution and another representation is provided at a reduced resolution, depending on the circumstance. For example, for a particular computer processor operation a reduced resolution data may be sufficient. A first data representation can be stored in a first memory plane and an additional portion of the first data representation stored in a second memory plane. A second data representation can be stored in the second memory plane with the additional portion of the first data representation. The first data representation, the additional portion of the first data representation and the second data representation can all be fetched together at the same time, such as if the first data representation represented luminance data and the second data representation represented corresponding chrominance data.

The methods, devices, and logic described above may be implemented in other different ways in different combinations of hardware, software or both hardware and software. For example, the functionality described herein may be implemented using programmed hardware or firmware elements (e.g., application specific integrated circuits (ASICs), electrically erasable programmable read-only memories (EE-PROMs), controllers, microprocessors, combinations of elements, etc.), or other related components. The functionality described herein may be achieved using a computing apparatus that has access to a code memory which stores computer-readable program code for operation of the computing apparatus, in which case the computer-readable program code could be stored on a medium which is fixed, tangible and directly readable, (e.g., removable diskette, compact disc read only memory (CD-ROM), random access memory (RAM), dynamic random access memory (DRAM), read only memory (ROM,) fixed disk, USB drive, or other machine-readable medium such as magnetic disk or optical disk), or the computer-readable program code could be stored remotely but transmittable via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for storing data on a computer readable medium, comprising:
    providing a first data representation comprising luminance data in a first memory plane of the computer readable medium;
    providing an additional portion of the first data representation in a second memory plane of the computer readable medium;
    providing a second data representation comprising chrominance data in the second memory plane with the additional portion of the first data representation; and
    fetching the first data representation from the first memory plane, and fetching both the additional portion of the first data representation and the second data representation from the second memory plane.

2. The method of claim 1 wherein the additional portion of the first data representation is grouped in a memory address adjacent to the second data representation.

3. The method of claim 1 further comprising fetching together the first data representation, the additional portion of the first data representation and the second data representation.

4. The method of claim 1 further comprising performing video motion compensation using the first data representation, the additional portion of the first data representation and the second data representation.

5. The method of claim 4 wherein the first data representation and the second data representation comprise YUV components.

6. A method for storing video data on a computer readable medium, comprising:
   providing a luminance data in a first memory plane of the computer readable medium;
   providing an additional portion of the luminance data in a second memory plane of the computer readable medium; and
   providing a chrominance data in the second memory plane;
   wherein the luminance data corresponds to the chrominance data and the additional portion of the luminance data is packaged with the chrominance data in the second memory plane.

7. The method of claim 6 wherein the luminance data is stored within a 32-bit word.

8. The method of claim 6 wherein the chrominance data and the additional luminance data is stored within a 32-bit word.

9. The method of claim 6 wherein the luminance data comprises 8-bit pixel representations.

10. The method of claim 9 wherein the luminance data and the additional portion of the luminance data together comprise 10-bit pixel representations.

11. The method of claim 10 wherein the 8-bit pixel representation comprises the 10-bit pixel representation with two least significant bits removed.

12. The method of claim 10 wherein the 8-bit representation is a rounded version of the 10-bit representation.

13. The method of claim 6 wherein the chrominance data in the second memory plane comprises an 8-bit representation and an extra 2-bit representation.

14. A video processing system, comprising:
   a memory to store video data, the memory comprising a first memory plane and a second memory plane;
   a decoder to fetch the video data for processing, the decoder configured to perform a fetch from the memory to obtain a luminance data stored in the first memory plane, and to obtain both an additional portion of the luminance data and a chrominance data, the additional portion of the luminance data and the chrominance data stored in association in the second memory plane.

15. The system of claim 14 wherein the luminance data is stored with 32-bits.

16. The system of claim 14 wherein the chrominance data and the additional portion of the luminance data is stored with 32-bits.

17. The system of claim 14 wherein the chrominance data and the additional luminance data are stored in adjacent memory addresses in the second memory plane.

18. The system of claim 14 wherein the luminance data and the chrominance data are a series of bits representative of a pixel in a picture, and the combination of the luminance data stored in the first memory plane and the portion of the luminance data stored in the second plane provide a total series of bits of the luminance data.

19. The system of claim 14 wherein the luminance data and the chrominance data are a series of bits representative of a pixel in a picture, and a storage location of the luminance data in the first memory plane and a storage location of the additional portion of the luminance data and the chrominance data in the second memory plane each accommodate an equal number of bits.

* * * * *